Dec. 28, 1948.    B. MITCHELL    2,457,391
AIRPLANE TRAIN
Filed Feb. 8, 1944

INVENTOR.
Bruce Mitchell
BY
A. B. Bowman
Attorney

Patented Dec. 28, 1948

2,457,391

UNITED STATES PATENT OFFICE 2,457,391

AIRPLANE TRAIN

Bruce Mitchell, San Diego, Calif.

Application February 8, 1944, Serial No. 521,534

2 Claims. (Cl. 244—3)

My invention relates to an airplane train, more particularly to a power plane and a plurality of glider load carrying planes flexibly connected thereto and to each other and the objects of my invention are:

First, to provide an airplane train of this class with special means for connecting the fuselage of the several planes at their ends to provide fixed flexibility therebetween;

Second, to provide connection for such planes in which they are connected by substantially vertical and horizontal axes to provide sidewise and up and down relative movement only;

Third, to provide an airplane train of this class in which a power plane may be substantially conventional except that its fuselage should be circular in cross section and of constant diameter throughout except the front end streamlined;

Fourth, to provide an airplane train of this class wherein the load carrying planes are each provided with a relatively long straight, circular in cross section fuselage with wings and fins positioned substantially at the middle intermediate the ends of the fuselage;

Fifth, to provide an airplane train of this class in which the fuselage of the power plane and the following glider load carrying planes are substantially symmetrical forming a substantially single common sized fuselage in flexibly connected sections, each section supported by opposed centrally disposed supporting wings;

Sixth, to provide an airplane train of this class whereby the glider load carrying planes are only open receiving load at opposite ends of the fuselage thereof so that they may be loaded from either end;

Seventh, to provide an airplane train of this class in which each of the fuselages may be supported on wheels at the middle intermediate their ends and may be retractible if desired;

Eighth, to provide an airplane train of this class in which the fuselages of the load carrying planes add very little additional drag because the fuselage of the power plane parts the air and leaving only skin friction of the fuselage as a source of a parasite drag; and Ninth, to provide an airplane train of this class which is very simple and economical of construction throughout, easy to operate and load, efficient in action and which will not readily deteriorate or get out of order.

Figure 1:
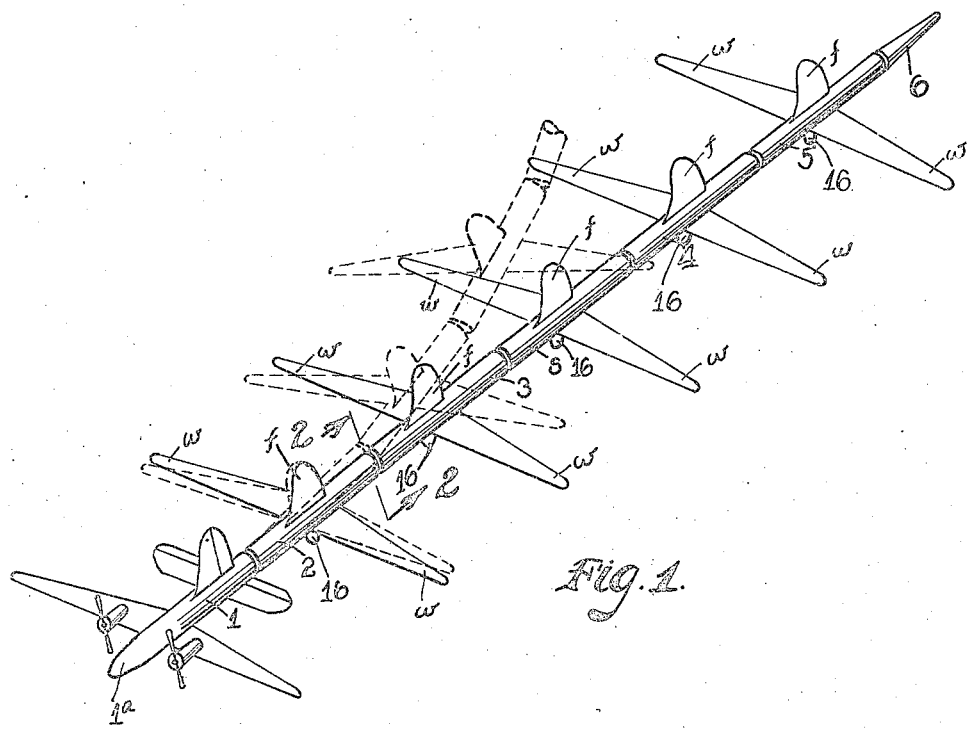
Figure 2:
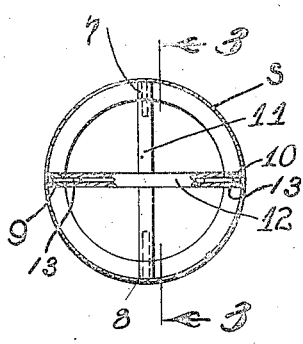
Figure 3:
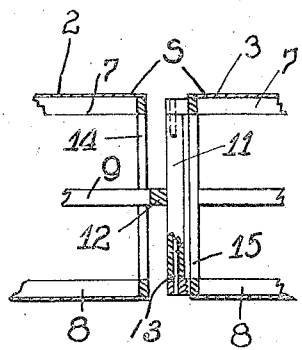

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a diagrammatic perspective view of my airplane train showing by dash lines varying position when changing the direction of the train; Fig. 2 is a sectional view on an enlarged scale taken from the line 2—2 of Fig. 1 and showing portions broken away and in section to facilitate the illustration; and Fig. 3 is a sectional view taken from the line 3—3 of Fig. 2 showing portions broken away and in section to facilitate the illustration.

Similar characters of reference refer to similar parts and portions throughout the several views of the drawing:

The power plane 1, glider load carrying planes 2, 3, 4 and 5, tail member 6, upper longérons 7, lower longérons 8, side longérons 9 and 10, cross members 11 and 12 and coupling pins 13 constitute the principal parts and portions of my airplane train in its preferred form.

The power plane 1 may be any conventional type of airplane. It is preferred, however, that the fuselage thereof be circular in cross section and of constant diameter except at the leading end where it is substantially pointed and streamlined at one end.

Connected to the trailing end of the fuselage 1 is a train of glider load carrying planes 2, 3, 4 and 5, each of which is provided with a relatively long hollow fuselage circular in cross section in full length and provided with longitudinally extending longérons extending the full length and covered with skin S, and open at the ends and from end to end for receiving goods to be carried at either end.

At opposite sides of each fuselage are supporting wings $w$. These wings may be rigidly secured or they may be adjustable in conventional manner to vary the angle of incidence. Positioned above the fuselage and secured centrally intermediate the opposed wings $w$ on each fuselage is a stationary fin $f$ and positioned at the lower side of the fuselage intermediate the wings $w$ so that the fuselage will substantially balance thereon is a wheel 16 which may be retractible in conventional manner, if desired. Secured at the trailing end of the last glider load carrying plane, which is in this case number five, there is provided a tail member 6, which is of similar construction as the fuselages 2 to 5 inclusive, of substantially the same diameter at the large end and tapering to a point. It is also hollow for carrying purposes. The plane 2 is connected with the plane 1 and the planes 2 to 5 inclusive are connected together and the tail member 6 is connected to the last fuselage in the following manner as shown best in Figs. 2 and 3 of the drawings. Each fuselage is provided with upper longérons 7, lower longérons 8, side longérons 9 and 10 and cross members 11 and 12 and arcuate strut members 14 and 15.

At the trailing end of each fuselage, including the power plane 1, the upper and lower longérons 7 and 8 are cut short and against their ends is secured the ring member 14 which forms a support for the trailing edge of the fin of the fuselage. The side longérons 9 and 10, however, extend slightly past the end at opposite sides and are pivotally connected to the cross member 12 at its end by means of pins 13 which serve as coupling pins, while the leading edge of each fuselage except the power plane fuselage, the upper and lower longérons 7 and 8 extend past the leading edge and they are connected to cross member 11 by means of coupling pins 13, thus providing pivotal connection of the fuselages on both vertical and horizontal axes, the cross members 11 and 12 being pivotally connected relatively to each other by means of the pins 13 in connection with the longérons extending from the fuselages at the front and at the leading and trailing ends, all as shown best in Figs. 2 and 3 of the drawing.

It will be here noted that with this coupling construction, as shown in Figs. 2 and 3, that if the power plane 1 changes its course sideways, that the following gliding load carrying planes follow in curved like form flexible at the joints, as shown by dash line in Fig. 1 of the drawing, and likewise the up and down movements so that the planes will have relative sidewise and up and down movement only and only till engaged by the perimeter or extending longérons of the two adjacent plane fuselages.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention what I claim as new and desire to secure by Letters Patent is:

1. In an airplane train of the class described, a glider load carrying airplane including the combination of a relatively long hollow circular in cross section invariable diameter fuselage open at its opposite ends and opposed wings secured thereto intermediate its ends, a vertical fin secured to the upper side of said fuselage intermediate said wing, and a wheel connected to said fuselage at its lower side intermediate its ends.

2. In an airplane train of the class described, a glider load carrying airplane including the combination of a relatively long hollow circular in cross section fuselage open at its opposite ends and opposed wings secured thereto intermediate its ends, a vertical fin secured to the upper side of said fuselage intermediate said wings, and a wheel connected to said fuselage at its lower side intermediate its ends, said wings, fin and wheel being positioned substantially at the longitudinal middle of said fuselage.

BRUCE MITCHELL.

REFERENCES CITED

The following references are of record in the file of this patent:

UNITED STATES PATENTS

| Number | Name | Date |
|---|---|---|
| 871,710 | Lane | Nov. 19, 1907 |
| 1,269,547 | Murray | June 11, 1918 |
| 1,382,535 | Offen | June 21, 1921 |
| 1,418,783 | Fokker | June 6, 1922 |
| 1,645,612 | Miller | Oct. 18, 1927 |
| 1,721,631 | Lewis | July 23, 1929 |
| 1,764,932 | Chadbourne | June 17, 1930 |
| 1,818,138 | Howland | Aug. 11, 1931 |
| 1,907,394 | Van Vactor | May 2, 1933 |
| 1,929,255 | Northrop | Oct. 3, 1933 |
| 1,968,497 | Magalis | July 31, 1934 |